(12) United States Patent
Zima et al.

(10) Patent No.: US 7,677,049 B2
(45) Date of Patent: Mar. 16, 2010

(54) ALGORITHM FOR ACTIVATION OF DIRECTED RELIEF SYSTEM FROM VEHICLE ACCELEROMETERS DURING CRASH

(75) Inventors: Mark James Zima, Clarence Center, NY (US); Prasad Shripad Kadle, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 508 days.

(21) Appl. No.: 11/712,320

(22) Filed: Feb. 28, 2007

(65) Prior Publication Data

US 2008/0202134 A1    Aug. 28, 2008

(51) Int. Cl.
*F25B 45/00* (2006.01)
*G01M 7/00* (2006.01)
*B60K 28/10* (2006.01)

(52) U.S. Cl. .............................. 62/149; 62/125; 62/129; 62/239; 73/12.01; 73/12.04; 73/117.01; 180/271; 180/274; 180/282

(58) Field of Classification Search .................. 62/125, 62/127, 129, 149, 174, 239; 73/11.01, 11.04, 73/12.01, 12.04, 12.07, 117.01, 118.01; 180/271, 180/274, 282

See application file for complete search history.

(56) References Cited

U.S. PATENT DOCUMENTS

| | | | |
|---|---|---|---|
| 5,684,701 A | 11/1997 | Breed | |
| 6,085,531 A | 7/2000 | Numoto et al. | |
| 6,240,738 B1* | 6/2001 | Kato et al. | 62/239 |
| 6,912,860 B2* | 7/2005 | Zima et al. | 62/149 |
| 7,028,496 B2* | 4/2006 | Komatsu | 62/239 |
| 2008/0060367 A1* | 3/2008 | Zima et al. | 62/149 |

OTHER PUBLICATIONS

European Search Report dated Feb. 10, 2009.

\* cited by examiner

*Primary Examiner*—Frantz F Jules
*Assistant Examiner*—Daniel C Comings
(74) *Attorney, Agent, or Firm*—Patrick M. Griffin (57) ABSTRACT

A method of venting a refrigerant from an air conditioning system of a vehicle during a crash to mitigate leakage of the refrigerant into a cabin of the vehicle by crashing a test vehicle under a first set of predetermined conditions a number of crash events and measuring deceleration and determining the existence of leakage. The number of crash events in which leakage existed is divided by the number of crash events to establish a probability of leakage ratio. The test vehicle is crashed under a second set of predetermined conditions to determine a second probability of leakage ratio. A probability of leakage relationship is established correlating the probability of leakage ratios and the predetermined conditions. A deceleration relationship is established correlating the deceleration measurements and the predetermined conditions. A deceleration of the vehicle is sensed to determine a probability of leakage from the probability of leakage relationship and the refrigerant is vented in response to the probability of leakage exceeding a predetermined threshold.

20 Claims, 5 Drawing Sheets

ALGORITHM FOR ACTIVATION OF DIRECTED RELIEF SYSTEM FROM VEHICLE ACCELEROMETERS DURING CRASH

BACKGROUND OF THE INVENTION

1. Field of the Invention

The subject invention relates to an air conditioning system, and more specifically, to a method of venting a refrigerant from the air conditioning system of a vehicle during a crash to mitigate leakage of the refrigerant into a cabin of the vehicle.

2. Description of the Prior Art

Air conditioning systems with directed relief valves for venting refrigerant are well known in the art. An example of such a system is disclosed in the U.S. Pat. No. 6,085,531 (the '531 patent) to Numoto et al.

The '531 patent discloses an air conditioning system utilizing a flammable refrigerant, such as propane. The system includes the standard components of a compressor, a condenser, an expansion device, and an evaporator. The system also includes a sensor to continuously monitor leakage of the refrigerant, particularly in an air space. When a leak is detected, the sensor generates a signal. A directed relief valve receives the signal and opens the valve in response to the signal to vent the refrigerant to the surrounding atmosphere.

While venting refrigerant contained within an air conditioning system after a leak is detected helps to prevent exposure to the refrigerant contained within the air conditioning system to the occupants of a vehicle, it does not prevent exposure to the refrigerant that has already leaked from the air conditioning system. In certain situations, such as a vehicle crash, the integrity of the air conditioning system can be severely compromised in an instant, causing refrigerant to leak from the air conditioning system before the refrigerant can be vented to the surrounding atmosphere. Additionally, in such situations, the directed relief system controlling the directed relief valve may become damaged entirely, thus preventing the directed relief valve from venting the refrigerant still contained within the air conditioning system. To mitigate such situations, systems for predicting leakage of a refrigerant from an air conditioning system have been implemented to vent the refrigerant from the air conditioning system before the leakage occurs. An example of such a system is disclosed in the U.S. Pat. No. 6,240,7381 (the '738 patent) to Kato et al.

The '738 patent discloses a refrigerant relief device for an air conditioning system having a sensor. When the sensor senses deceleration of the vehicle greater than a predetermined threshold amount, for example, an impact due to a collision of the vehicle, a CPU supplies current to a relief valve, discharging the refrigerant from the air conditioning system.

An additional system that predicts the occurrence of a vehicle crash is the U.S. Pat. No. 5,684,701 (the '701 patent) to Breed. The '701 patent discloses a sensor system for initiating deployment of an occupant protection apparatus in a vehicle, such as an air bag, to protect an occupant of the vehicle in a crash. A neural network is trained using data from approximately 25 crash events, and in addition, techniques of velocity and crash scaling are used to create a large library of crashes. A sensor senses deceleration of the vehicle, and the neural network determines if the signal contains a pattern characteristic of a vehicle crash by directly comparing the signal to the library of crash events. If the neural network determines the signal from the sensor is similar to a stored signal in the library of crash events, a deployment initiation mechanism initiates deployment of the occupant protection apparatus.

Although there are prior art systems for venting a refrigerant from an air conditioning system in anticipation of a leak, there remains the need for a system that more accurately predicts the possibility of a refrigerant leak from an air conditioning system of a vehicle during a crash.

SUMMARY OF THE INVENTION AND ADVANTAGES

The invention provides a method of venting a refrigerant from an air conditioning system of a vehicle during a crash to mitigate leakage into a cabin of the vehicle. The method comprises the steps of crashing a test vehicle having an air conditioning test system under a first set of predetermined conditions a number of first crash events, determining the existence of leakage of a test refrigerant from the air conditioning test system during each of the number of first crash events, dividing the number of first crash events in which leakage of the test refrigerant under the first set of predetermined conditions existed by the number of first crash events to establish a first probability of leakage ratio, crashing the test vehicle under a second set of predetermined conditions a number of second crash events, determining the existence of leakage of the test refrigerant from the air conditioning test system each of the number of second crash events, dividing the number of second crash events in which leakage of the test refrigerant under the second set of predetermined conditions existed by the number of second crash events to establish a second probability of leakage ratio, correlating the predetermined conditions and the probability of leakage ratios to establish a probability of leakage relationship, sensing a condition of the vehicle to determine a probability of leakage ratio from the probability of leakage relationship, and venting the refrigerant from the air conditioning system in response to the probability of leakage ratio exceeding a predetermined threshold.

European legislation will require the phase-out of R-134a in mobile air conditioning systems beginning in 2011. There are several alternatives under consideration; however, some of these alternatives have potential safety risks. To help mitigate the potential risk from a possible leak into the passenger compartment during a crash event, the method will sense a condition of a vehicle to determine a probability of leakage ratio from a probability of leakage relationship in order to vent the refrigerant from the air conditioning system when the probability of leakage ratio exceeds a predetermined threshold before the occurrence of the crash event.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 3:
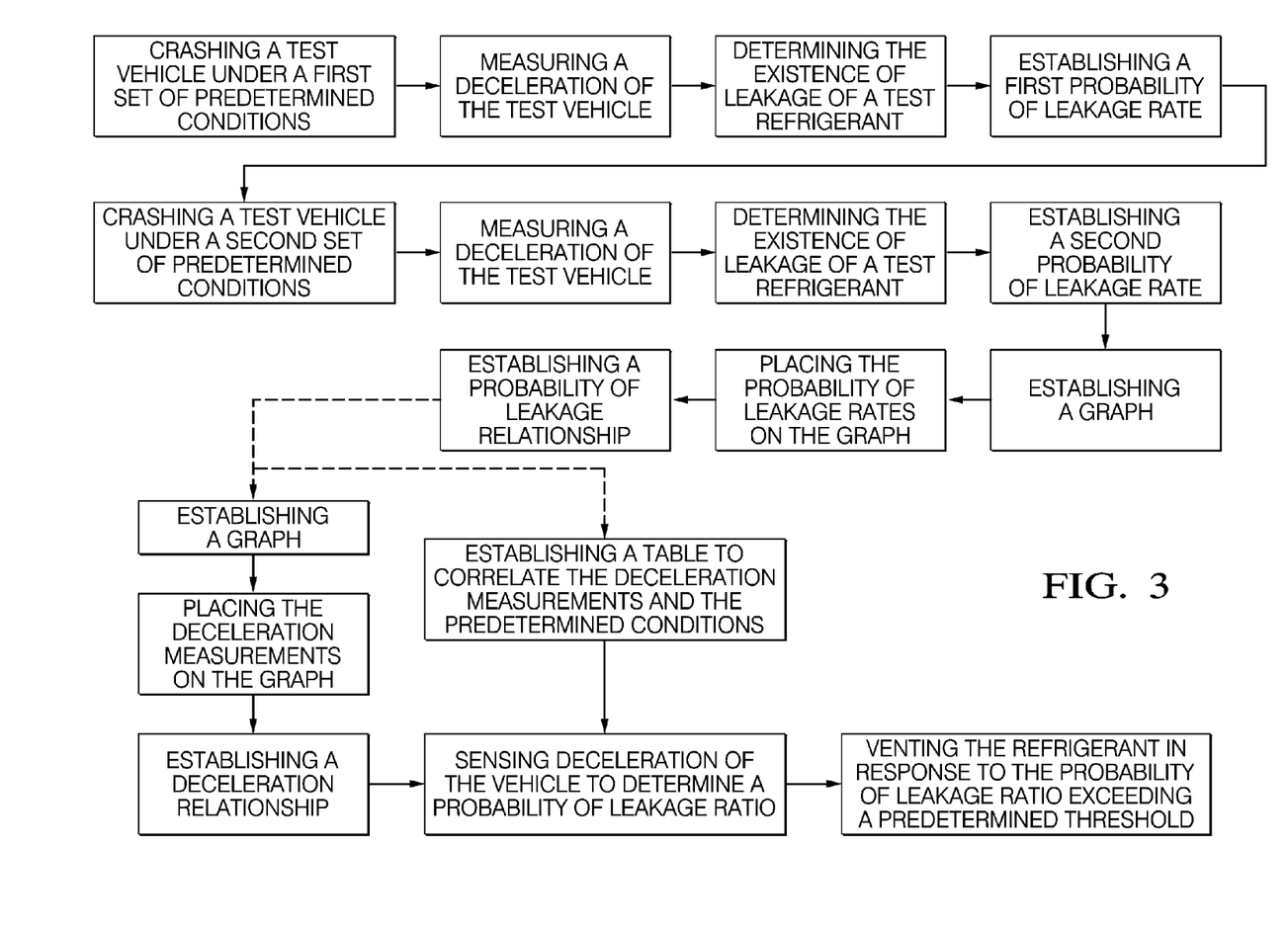
FIG. 3 is a flowchart showing an algorithm for venting a refrigerant from an air conditioning system of a vehicle.

Referring to the Figures, wherein like numerals indicate corresponding parts throughout the several views, a method of venting a refrigerant from an air conditioning system 20 of a vehicle is shown in FIG. 3. An example of such an air conditioning system is shown at 20 in FIG. 1. Those skilled in the art appreciate that the method may be used to vent alternative air conditioning systems 20. Preferably, the air conditioning system 20 is located in a vehicle. However, those skilled in the art realize alternatives in which the air conditioning system 20 is implemented into a building, an industrial cooling system, a refrigerator, etc.

The air conditioning system 20 utilizes a refrigerant. The refrigerant is of type R-152a or carbon dioxide ($CO_2$). Those skilled in the art appreciate that other refrigerants could also be employed. These refrigerants include, but are not limited to R-12/CFC-12, R-134a/HFC-134a, isobutane, and propane.

Figure 1:
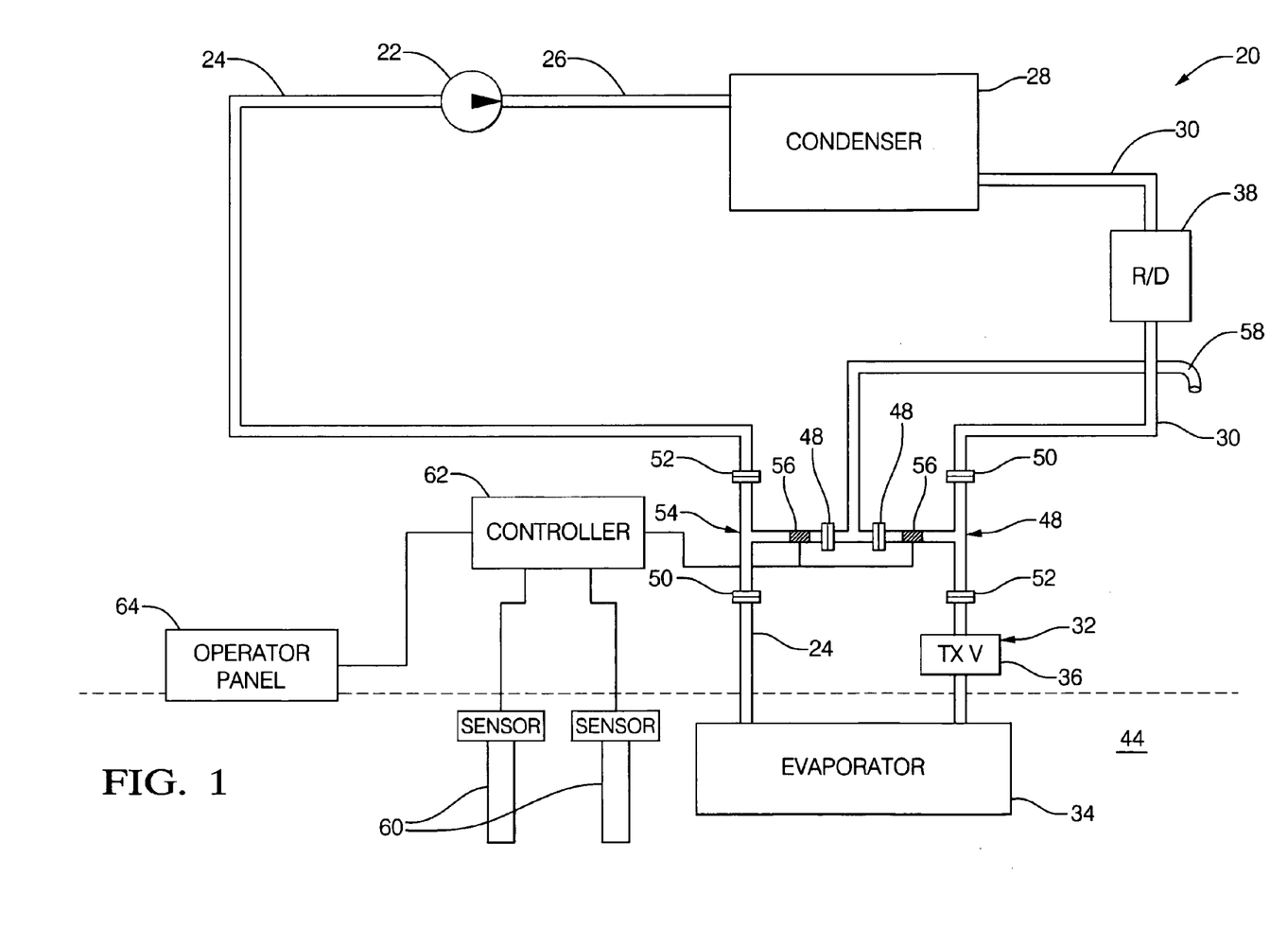
FIG. 1 is a schematic view of a first embodiment of an air conditioning system showing a thermostatic expansion valve implemented as an expansion device.
Figure 2:
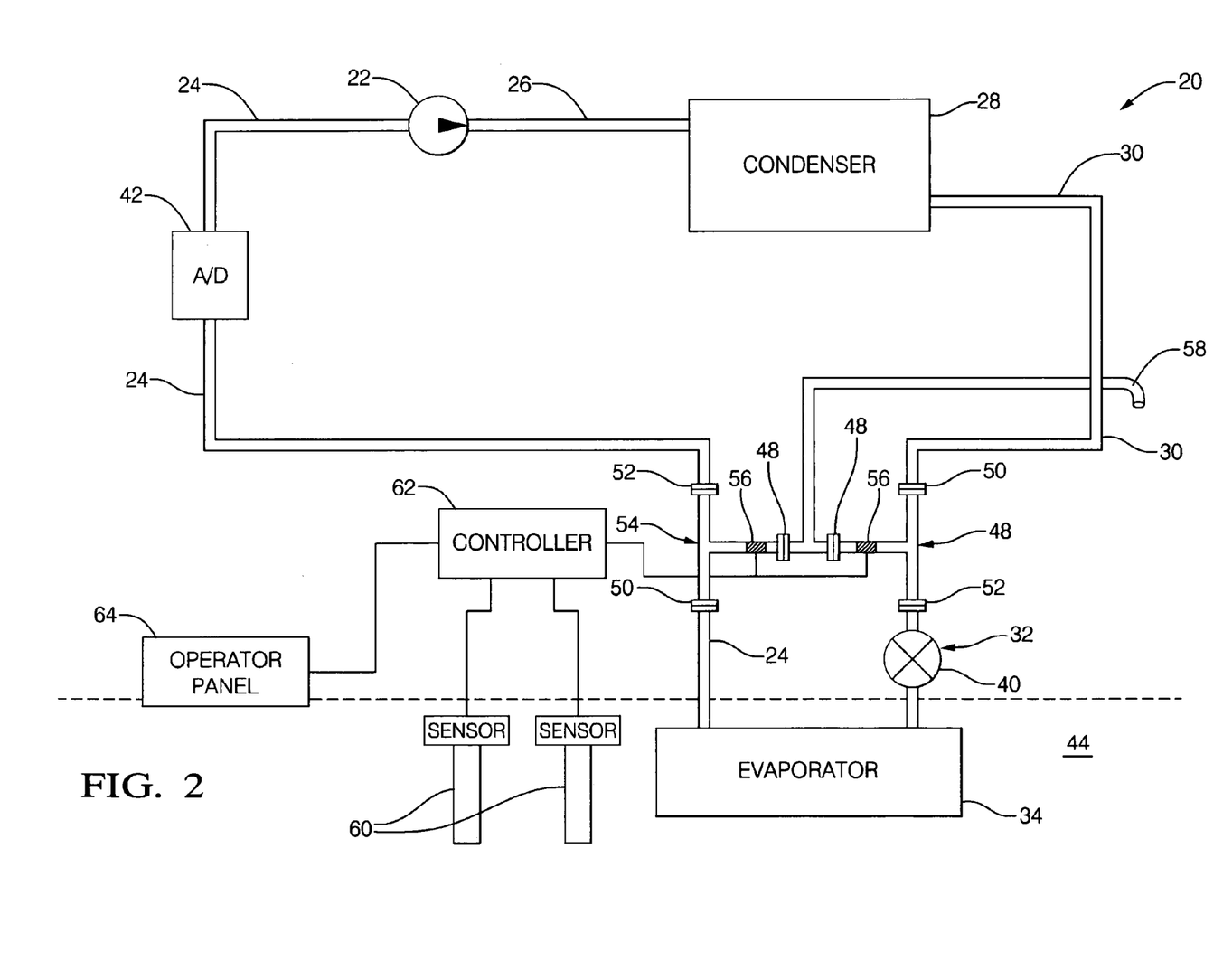
FIG. 2 is a schematic view of a second embodiment of the air conditioning system showing an orifice tube implemented as the expansion device.

A compressor 22 is operatively connected to a suction line 24. The suction line 24 contains the refrigerant in a low pressure, gaseous state. The compressor 22 receives the refrigerant from the suction line 24 and compresses the refrigerant into a high-pressure gaseous state. A gas line 26 is operatively connected to the compressor 22 for receiving the refrigerant and transporting it along in the system. A condenser 28 or gas cooler is operatively connected to the gas line 26. The condenser 28 cools the refrigerant received from the gas line 26. The condenser 28 dissipates heat removed from the refrigerant to the environment. A liquid line 30 is operatively connected to the condenser 28 for receiving the refrigerant from the condenser 28. An expansion device 32 is operatively connected to the liquid line 30. An evaporator 34 is also operatively connected to the expansion device 32. The expansion device 32 restricts the flow of the refrigerant using the Joules-Thompson effect to significantly cool and lower the pressure of the refrigerant before entering the evaporator 34. In a first embodiment of FIG. 1, a thermostatic expansion valve (TXV) 36 performs the function of the expansion device 32. The TXV 36 dynamically regulates the flow of refrigerant into the evaporator 34. In this first embodiment, a receiver/dryer 38 is typically connected in-line with the liquid line 30. Alternatively, the receiver/dryer 38 may be integrated into the condenser 28. In a second embodiment, as shown in FIG. 2, an orifice tube 40 is used as a static, fixed implementation of the expansion device 32. An accumulator/dehydrator 42 is implemented in-line with the suction line 24 in the second embodiment. The evaporator 34 is preferably located within an air space 44 and includes a series of coils. As air flows through the air space 44 and the evaporator 34, it is cooled by heat exchange with the coils of the evaporator 34. The evaporator 34 is also operatively connected to the suction line 24 for sending the now low-pressure, mostly gaseous refrigerant back to the compressor 22.

A first directed relief valve 46 is integrated with the air conditioning system 20 in order to vent the refrigerant to the atmosphere. The first directed relief valve 46 includes an ambient port 48 open to the atmosphere. The first directed relief valve 46 also includes an inlet 50 for receiving the refrigerant and an outlet 52 for sending the refrigerant. The inlet 50 and outlet 52 are operatively connected inline to one of the lines 24, 26, 30, such as the suction line 24, the gas line 26, or the liquid line 30. Additional directed relief valves, such as a second directed relief valve 54, may also be implemented in the system. The embodiments shown in FIGS. 1 and 2 illustrate the first directed relief valve 46 in-line with the liquid line 30 and the second directed relief valve 54 in-line with the suction line 24. Those skilled in the art realize that alternate locations and quantities of the directed relief valves 46, 54 are possible. However, for ease of illustration, only the first directed relief valve 46 will be described hereforth.

A squib 56 is positioned within the first directed relief valve 46 to block the inlet 50 and the outlet 52 from the ambient port 48. During normal operation, when a probability of leakage ratio is below a predetermined threshold, refrigerant enters the inlet 50 and flows out the outlet 52; no refrigerant flows to the ambient port 48. However, in response to the probability of leakage ratio exceeding a predetermined threshold, the squib 56 detonates and deflagrates, thus unblocking the inlet 50 and the outlet 52 from the ambient port 48. Refrigerant then flows in through the inlet 50 and the outlet 52 to the ambient port 48. The ambient port 48 is preferably connected to a port tube 58. The port tube 58 leads to a location away from the air space 44 for venting the refrigerant to the atmosphere. Experimentation with the air conditioning system 20 has shown that venting the refrigerant from the system takes about six to ten seconds. Venting of the refrigerant may be required for a number of reasons, including, but not limited to, potential toxicity or flammability related to the refrigerant.

The air conditioning system 20 uses a sensor 60 for sensing a condition of the vehicle to determine the probability of leakage ratio. The sensor 60 senses a condition and produces a sensor 60 signal in response to sensing the condition. Various types of conditions can be sensed, including, but not limited to, deceleration, impact, or front end crush. Depending on the reliability and sensing needs of the sensor 60, additional sensors 60 may be required.

A controller 62 is electrically connected to the sensor 60 and the squib 56. The controller 62 contains all the necessary electrical and electronic components to perform its function as described herein. These components include, but are not limited to, a power supply, a microprocessor, an analog-to-digital converter, an amplifier, and a relay. The controller 62 receives a sensor 60 signal from the sensor 60. The controller 62 analyzes the sensor 60 signal by evaluating a relationship with the current value of the sensor 60, comparing the current value to a lookup table, or comparing the current value to any other set of predetermined values stored within the controller 62. In analyzing the sensor 60 signal, the controller 62 determines the probability of leakage ratio. In response to the probability of leakage ratio exceeding a predetermined threshold, the controller 62 sends a venting signal to the squib 56. The squib 56 then initiates an opening by deflagrating, causing the refrigerant to be vented from the system to the atmosphere.

The method of venting a refrigerant from the air conditioning system 20 of a vehicle is shown in FIG. 3 and consists of the step of crashing a test vehicle having an air conditioning test system under a first set of predetermined conditions a number of first crash events. These tests are preferably done in conjunction with crash tests done for other purposes, such as vehicle crashworthiness tests or airbag evaluations. The predetermined conditions can be, but are not limited to, velocity, offset, barrier type and geometry, or impact sled. The test vehicle is preferably of the same type as the vehicle, however, test vehicles differing from the vehicle can also be used.

The method includes the step of measuring a deceleration of the test vehicle each of the number of first crash events to establish a number of first deceleration measurements.

The method includes the step of determining the existence of leakage of a test refrigerant from the air conditioning test system each of the number of first crash events. In determining the existence of leakage, all forms of leakage can be considered, or only those leaks that do not result from a puncture can be considered. There are ways to mitigate punctures in an air conditioning system, including different, softer grille plastics that do not result in sharp objects when broken and rounding of sharp metal edges in front of a condenser, especially on the hood latch. Therefore, depending upon whether the original equipment manufactures consider design modifications to reduce punctures, the determining of the existence of leakage can either include or ignore leakage as a result of punctures. Preferably the types of leaks considered will remain constant throughout the number of first crash events.

The method includes the step of dividing the number of first crash events in which leakage of the test refrigerant under the first set of predetermined conditions existed by the number of first crash events to establish a first probability of leakage ratio.

The method includes the step of crashing the test vehicle under a second set of predetermined conditions a number of second crash events. The test vehicle is preferably of the same kind as the test vehicle crashed under the first set of predetermined conditions, but a test vehicle of a different kind may also be used to provide general test crash results covering a wide range of vehicles. Preferably, the test vehicle crashed under the second crash events is of the same kind as the test vehicle crashed under the first set of predetermined conditions, and the test vehicles are of the same kind as the vehicle.

The method includes the step of measuring the deceleration of the test vehicle each of the number of second crash events to establish a number of second deceleration measurements.

Figure 4:
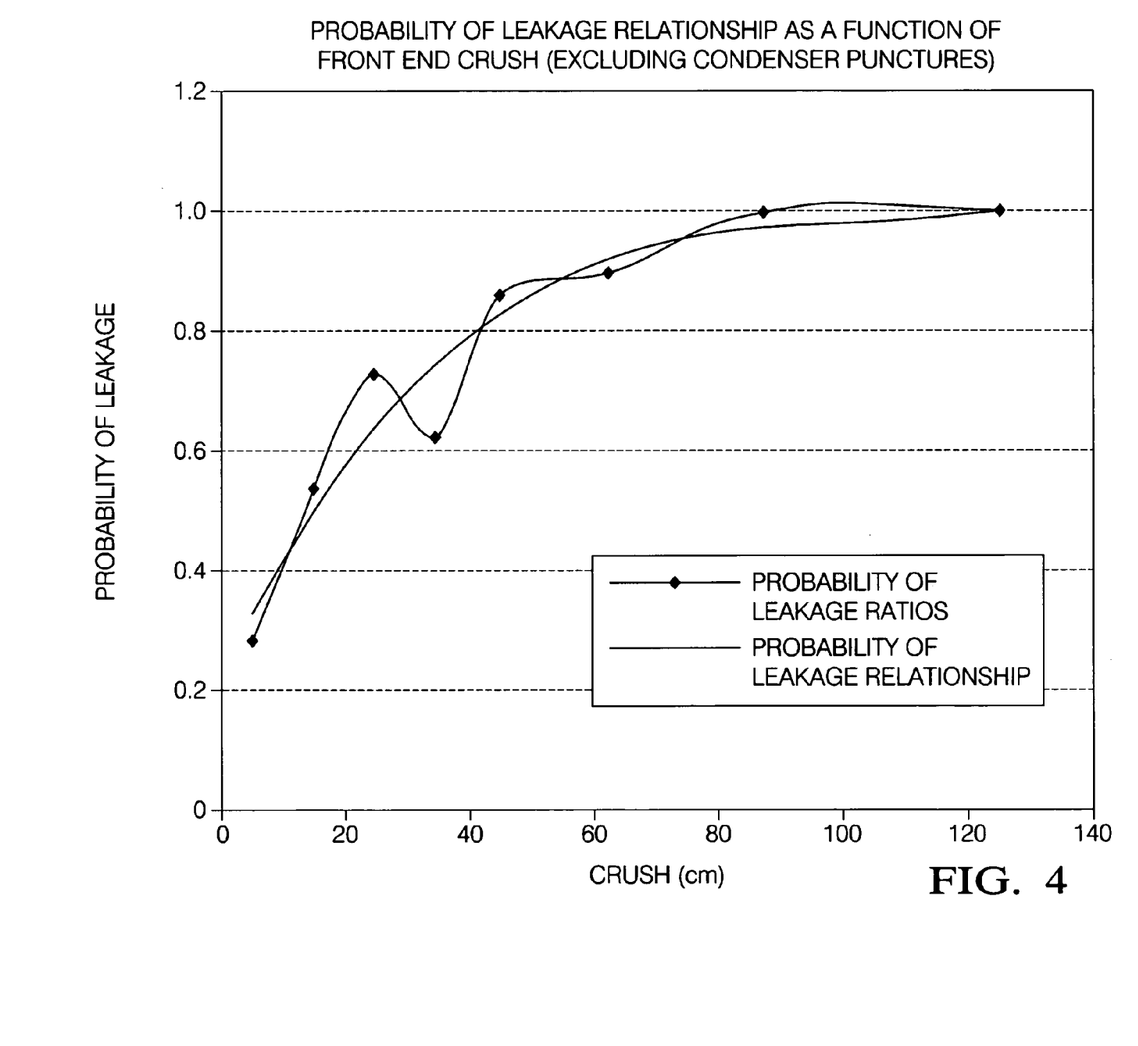
FIG. 4 is a graph of a first embodiment of the probability of leakage relationship.

The method includes the step of determining the existence of leakage of the test refrigerant from the air conditioning test system each of the number of second crash events. In determining the existence of leakage of the number of second crash events, all forms of leakage can be considered, or only those leaks that do not result from a puncture can be considered. There are ways to mitigate punctures in an air conditioning system, including different, softer grille plastics that do not result in sharp objects when broken and rounding of sharp metal edges in front of a condenser, especially on the hood latch. Therefore, depending upon whether the original equipment manufactures consider design modifications to reduce punctures, the determining of the existence of leakage can either include or ignore leakage as a result of punctures. In an embodiment of the present invention as shown in FIG. 4, leakage as a result of punctures was excluded, however, in the embodiment shown in FIG. 5, leakage as a result of punctures was included. Preferably the types of leaks considered will remain constant throughout the number of second crash events, and preferably the types of leaks considered under the number of second crash events are the same as those considered under the number of first crash events.

The method includes the step of dividing the number of second crash events in which leakage of the test refrigerant under the second set of predetermined conditions existed by the number of second crash events to establish a second probability of leakage ratio, The method includes the step of correlating the predetermined conditions and the probability of leakage ratios to establish a probability of leakage relationship. In an embodiment of the invention, the step of correlating the predetermined conditions and the probability of leakage ratios to establish a probability of leakage relationship is further defined as establishing a graph with the predetermined conditions on an x-axis and the probability of leakage ratios on a y-axis, placing the probability of leakage ratios on the graph as shown in FIG. 4, and establishing a probability of leakage relationship of the probability of leakage ratios. The probability of leakage relationship can be, but is not limited to, being a polynomial regression of the probability of leakage ratios. In the embodiment of the invention shown in FIG. 4, the probability of leakage relationship is established as being a third order polynomial regression of the probability of leakage ratios relating the predetermined condition, front end crush in this embodiment, to the probability of leakage. The probability of leakage relationship of the invention as shown in FIG. 4 is furthered defined as $$y = 6_E{-07}x^3 - 0.0002x^2 + 0.0209x + 0.2266 \text{ for } x > 5 \text{ cm}$$

wherein y is the probability of leakage ratio and x is the predetermined condition, front end crush in cm.

Figure 5:
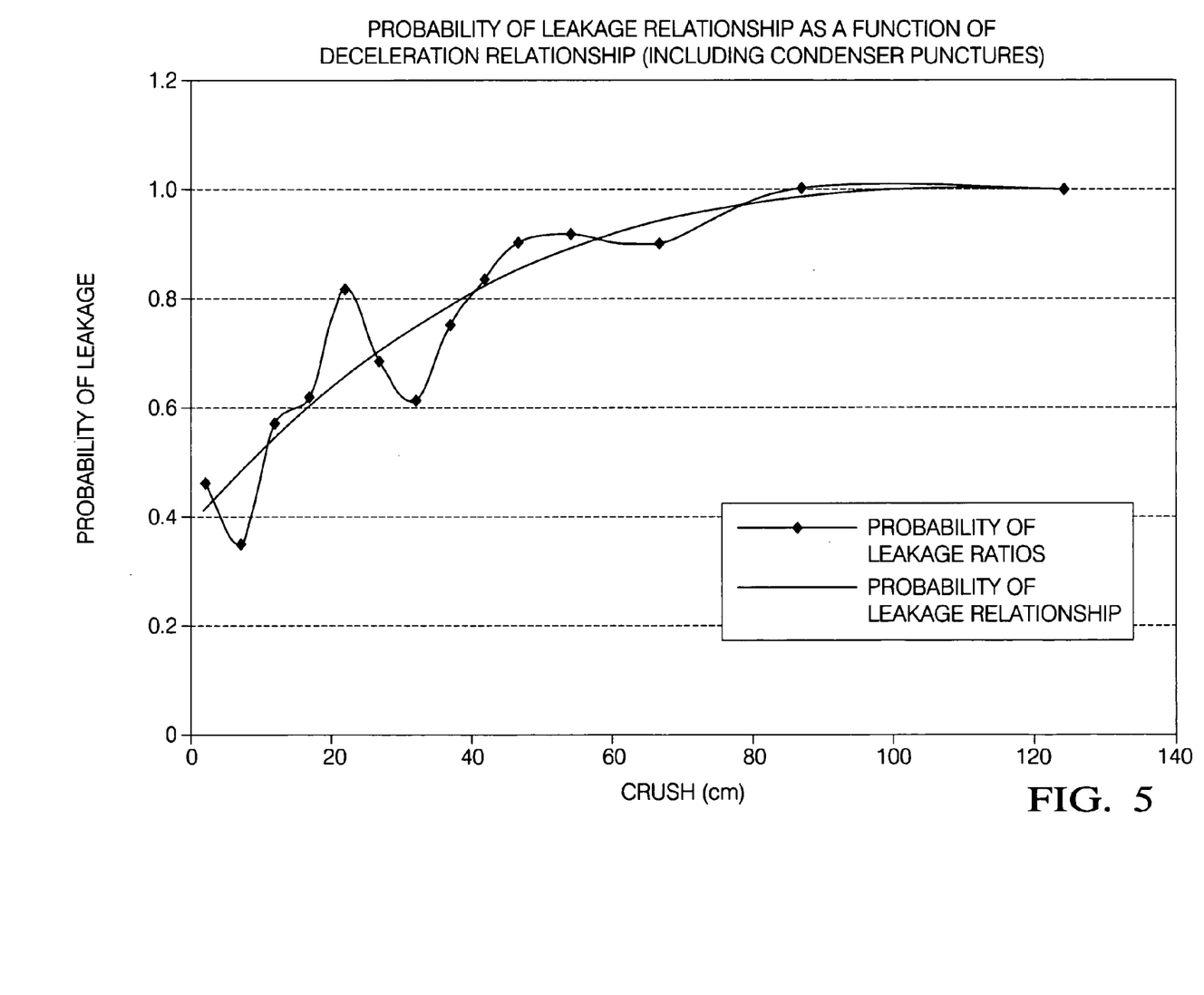
FIG. 5 is a graph of a second embodiment of the probability of leakage relationship.

The method includes the step of correlating the deceleration measurements of the test vehicle and the predetermined conditions to establish a deceleration relationship to the probability of leakage ratios. In an embodiment of the present invention, the step of correlating the deceleration measurements of the test vehicle and the predetermined conditions to establish a deceleration relationship to the probability of leakage ratios can be further defined as establishing a trigger graph with the deceleration measurements of the test vehicle on a trigger x-axis and the predetermined conditions on a trigger y-axis, placing the deceleration measurements on the trigger graph, and establishing the deceleration relationship of the deceleration measurements to the probability of leakage relationship. In this embodiment of the present invention, correlating the deceleration measurements of the test vehicle to the predetermined conditions will establish a deceleration relationship whereby the predetermined conditions are expressed as a function of deceleration. The probability of leakage relationship, expressed as the probability of leakage being a function of the predetermined conditions, can thereby be simplified to further define the probability of leakage relationship as being the probability of leakage being a function of the deceleration relationship as shown in FIG. 5. In this embodiment, the probability of leakage relationship as shown in FIG. 5 is further defined as $$y = 3_E{-07}x^3 - 0.0001x^2 + 0.0149x + 0.3742 \text{ for } x > 5 \text{ cm},$$

wherein y is probability of leakage and x is crush in centimeters and x=f(a) where a is deceleration and this function is typically obtained from vehicle crash test results and those skilled in the art recognize that other means to obtain this function are possible.

In another embodiment of the present invention, the step of correlating the deceleration measurements of the test vehicle and the predetermined conditions to establish a deceleration relationship to the probability of leakage ratios can be further defined as establishing a table to correlate the deceleration measurements and the predetermined conditions to establish the deceleration relationship to the probability of leakage ratios. In an alternative embodiment of the present invention, a condition other than deceleration, such as, but not limited to, impact or front end crush is measured of the test vehicle during the first and second crash events. The condition is correlated with the predetermined conditions to establish a condition relationship to the probability of leakage ratios.

The method includes the step of sensing a condition of the vehicle to determine the probability of leakage ratio from the probability of leakage relationship. In the preferred embodiment of the invention, the condition sensed is deceleration. In alternative embodiments of the present invention, the condition sensed is, but is not limited to, impact or front end crush.

The method includes the step of venting the refrigerant from the air conditioning system 20 in response to the probability of leakage ratio exceeding a predetermined threshold. The original equipment manufacturer sets the air conditioning system 20 to vent the refrigerant based on a trade-off between the probability of having the air conditioning system 20 functional in a drivable post-crash vehicle versus mitigating the risk by discharging the refrigerant. It is most accurate if an original equipment manufacturer plots out the probability of refrigerant leakage versus the predetermined conditions for each of their car platforms or constructions. However, if an original equipment manufacturer does not have enough data to do this, the curves generated in FIG. 4 and FIG. 5 based on a random post-collision vehicle sample is the next best alternative.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of venting a refrigerant from an air conditioning system of a vehicle during a crash to mitigate leakage into a cabin of the vehicle, said method comprising the steps of;
    crashing a test vehicle having an air conditioning test system under a first set of predetermined conditions a number of first crash events,
    determining the existence of leakage of a test refrigerant from the air conditioning test system each of the number of first crash events,
    dividing the number of first crash events in which leakage of the test refrigerant under the first set of predetermined conditions existed by the number of first crash events to establish a first probability of leakage ratio,
    crashing the test vehicle under a second set of predetermined conditions a number of second crash events,
    determining the existence of leakage of the test refrigerant from the air conditioning test system each of the number of second crash events,
    dividing the number of second crash events in which leakage of the test refrigerant under the second set of predetermined conditions existed by the number of second crash events to establish a second probability of leakage ratio,
    correlating the predetermined conditions and the probability of leakage ratios to establish a probability of leakage relationship,
    sensing a condition of the vehicle to determine a probability of leakage ratio from the probability of leakage relationship, and
    venting the refrigerant from the air conditioning system in response to the probability of leakage ratio exceeding a predetermined threshold.

2. A method as set forth in claim 1 wherein said correlating the predetermined conditions and the probability of leakage ratios to establish a probability of leakage relationship step is further defined as;
    establishing a graph with the predetermined conditions on an x-axis and the probability of leakage ratios on a y-axis,
    placing the probability of leakage ratios on the graph, and
    establishing the probability of leakage relationship of the probability of leakage ratios.

3. A method as set forth in claim 2 wherein the probability of leakage relationship is further defined as being a polynomial regression of the probability of leakage ratios.

4. A method as set forth in claim 3 wherein the probability of leakage relationship is further defined as $$y = 6_E{-07}x^3 - 0.0002x^2 + 0.0209x + 0.2266$$

wherein y is the probability of leakage ratio and x is the predetermined conditions.

5. A method as set forth in claim 3 wherein the probability of leakage relationship is further defined as $$y = 3_E{-07}x^3 - 0.0001x^2 + 0.0149x + 0.3742$$

wherein y is the probability of leakage ratio and x is the predetermined conditions.

6. A method as set forth in claim 1 including the steps of measuring a deceleration of the test vehicle each of the number of first crash events to establish a number of first deceleration measurements and measuring the deceleration of the test vehicle each of the number of second crash events to establish a number of second deceleration measurements.

7. A method as set forth in claim 6 including the step of correlating the deceleration measurements of the test vehicle and the predetermined conditions to establish a deceleration relationship to the probability of leakage ratios.

8. A method as set forth in claim 7 wherein said correlating the deceleration measurements step is further defined as;
    establishing a trigger graph with the deceleration measurements of the test vehicle on a trigger x-axis and the predetermined conditions on a trigger y-axis,
    placing the deceleration measurements on the trigger graph, and
    establishing the deceleration relationship of the deceleration measurements.

9. A method as set forth in claim 8 wherein the deceleration relationship to the probability of leakage ratios is further defined as being a polynomial regression of the deceleration measurements.

10. A method as set forth in claim 7 wherein said correlating the deceleration measurements step is further defined as establishing a table to correlate the deceleration measurements and the predetermined conditions to establish the deceleration relationship to the probability of leakage ratios.

11. A method as set forth in claim 7 wherein said correlating the predetermined conditions and the probability of leakage ratios to establish a probability of leakage relationship step is further defined as;
    establishing a graph with the predetermined conditions on an x-axis and the probability of leakage ratios on a y-axis,
    placing the probability of leakage ratios on the graph, and
    establishing the probability of leakage relationship of the probability of leakage ratios.

12. A method as set forth in claim 11 wherein the probability of leakage relationship is further defined as being a polynomial regression of the probability of leakage ratios.

13. A method as set forth in claim 12 wherein the probability of leakage relationship is further defined as $$y = 6_E{-07}x^3 - 0.0002x^2 + 0.0209x + 0.2266$$

wherein y is the probability of leakage ratio and x is the deceleration relationship correlating the deceleration of the vehicle and the predetermined conditions.

14. A method as set forth in claim 12 wherein the probability of leakage relationship is further defined as $$y=3 e^{-07}x^3-0.001x^2+0.0149x+0.3742$$

wherein y is the probability of leakage ratio and x is the deceleration relationship correlating the deceleration of the vehicle and the predetermined conditions.

15. A method as set forth in claim 11 wherein said sensing a condition of the vehicle step is further defined as sensing deceleration of the vehicle to determine a probability of leakage ratio from the deceleration relationship.

16. A method of venting a refrigerant from an air conditioning system of a vehicle during a crash to mitigate leakage into a cabin of the vehicle, said method comprising the steps of;
    crashing a test vehicle having an air conditioning test system under a first set of predetermined conditions a number of first crash events,
    measuring a deceleration of the test vehicle each of the number of first crash events to establish a number of first deceleration measurements,
    determining the existence of leakage of a test refrigerant from the air conditioning test system each of the number of first crash events,
    dividing the number of first crash events in which leakage of the test refrigerant under the first set of predetermined conditions existed by the number of first crash events to establish a first probability of leakage ratio,
    crashing the test vehicle under a second set of predetermined conditions a number of second crash events,
    measuring the deceleration of the test vehicle each of the number of second crash events to establish a number of second deceleration measurements,
    determining the existence of leakage of the test refrigerant from the air conditioning test system each of the number of second crash events,
    dividing the number of second crash events in which leakage of the test refrigerant under the second set of predetermined conditions existed by the number of second crash events to establish a second probability of leakage ratio,
    establishing a graph with the predetermined conditions on an x-axis and the probability of leakage ratios on a y-axis,
    placing the probability of leakage ratios on the graph,
    establishing a probability of leakage relationship being a polynomial regression of the probability of leakage ratios,
    correlating the deceleration measurements of the test vehicle and the predetermined conditions to establish a deceleration relationship to the probability of leakage ratios,
    sensing deceleration of the vehicle to determine the probability of leakage ratio from the deceleration relationship, and
    venting the refrigerant from the air conditioning system in response to the probability of leakage ratio exceeding a predetermined threshold.

17. A method as set forth in claim 16 wherein the probability of leakage relationship is further defined as $$y=6 e^{-07}x^3-0.0002x^2+0.0209x+0.2266$$

wherein y is the probability of leakage ratio and x is the deceleration relationship correlating the deceleration of the vehicle and the predetermined conditions.

18. A method as set forth in claim 16 wherein the probability of leakage relationship is further defined as $$y=3 e^{-07}x^3-0.000x^2+0.0149x+0.3742$$

wherein y is the probability of leakage ratio and x is the deceleration relationship correlating the deceleration of the vehicle and the predetermined conditions.

19. A method as set forth in claim 16 wherein said correlating the deceleration of the test vehicle and the predetermined conditions to establish a deceleration relationship to the probability of leakage ratios step is further defined as;
    establishing a trigger graph with the deceleration measurements of the test vehicle on a trigger x-axis and the predetermined conditions on a trigger y-axis,
    placing the deceleration measurements on the trigger graph, and
    establishing the deceleration relationship to the probability of leakage ratios wherein the deceleration relationship is a polynomial regression of the deceleration measurements.

20. A method as set forth in claim 16 wherein said correlating the deceleration of the vehicle and the predetermined conditions to establish a deceleration relationship to the probability of leakage ratios step is further defined as establishing a table to correlate the deceleration measurements and the predetermined conditions to establish the deceleration relationship to the probability of leakage ratios.

* * * * *